J. THOMAS.
MECHANICAL LUBRICATOR.
APPLICATION FILED JULY 28, 1911.

1,048,914.

Patented Dec. 31, 1912.

2 SHEETS—SHEET 1.

Witnesses:
H C Hunsberger
U C Landenberger

Inventor,
John Thomas,
By B. Singer
Attorney.

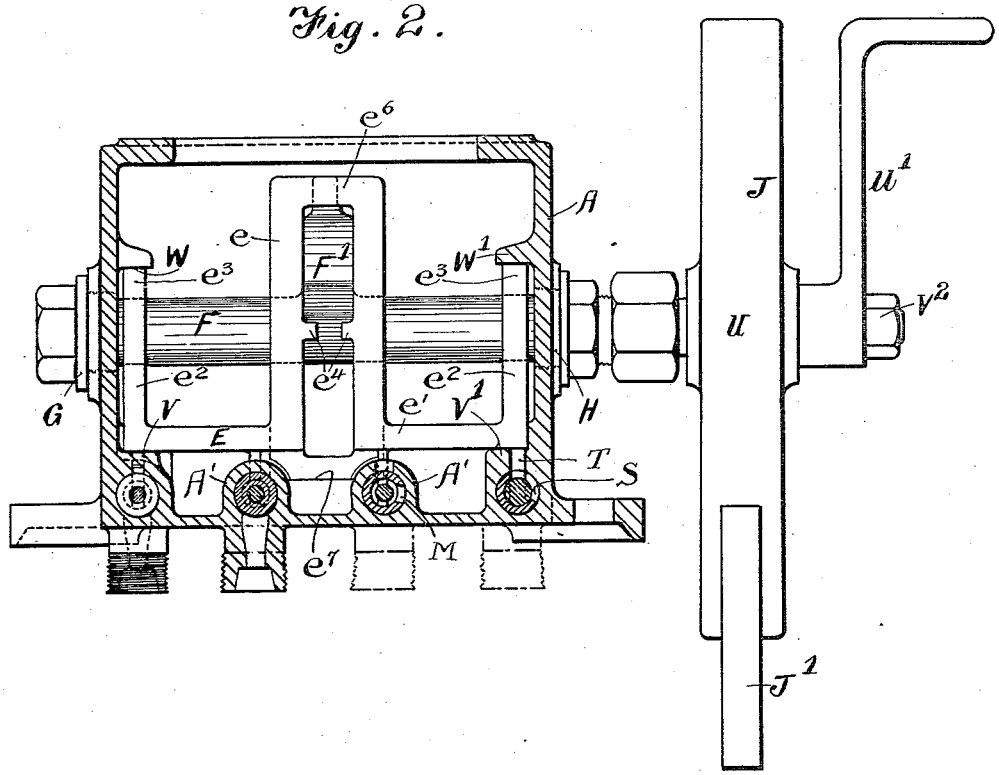

UNITED STATES PATENT OFFICE.

JOHN THOMAS, OF WEST EALING, ENGLAND, ASSIGNOR TO THE LAMBETH BRASS & IRON COMPANY, LTD., OF LONDON, ENGLAND, A CORPORATION OF GREAT BRITAIN.

MECHANICAL LUBRICATOR.

1,048,914.      Specification of Letters Patent.      Patented Dec. 31, 1912.

Application filed July 28, 1911. Serial No. 641,140.

*To all whom it may concern:*

Be it known that I, JOHN THOMAS, a subject of the King of Great Britain, residing at 89 Kingsley avenue, West Ealing, in the county of Middlesex, England, have invented a new and useful Mechanical Lubricator, of which the following is a specification.

This invention relates to mechanical lubricators of that class in which a pump is employed to force the lubricant to the bearings, and has for its primary objects to dispense with ball valves or springs, while effecting a uniform feed throughout the full stroke of the pump.

According to my improved method of construction, the oil reservoir is formed with a barrel which is furnished with an internal tube divided into two chambers, and in each chamber is a piston or plunger. These two plungers are connected together and reciprocated by suitable means while the sleeve and the barrel are formed with inlet and outlet ports so arranged that when the plungers are reciprocated the sleeve is turned and its chambers successively charged with the lubricant, the pistons then forcing the lubricant through the outlet from the barrel. The sleeve is adjustably mounted within the barrel so that the charge of the lubricant may be regulated.

An embodiment of my invention is illustrated in the accompanying drawings, same showing by way of example an oil reservoir furnished with four lubricators.

Figure 1:
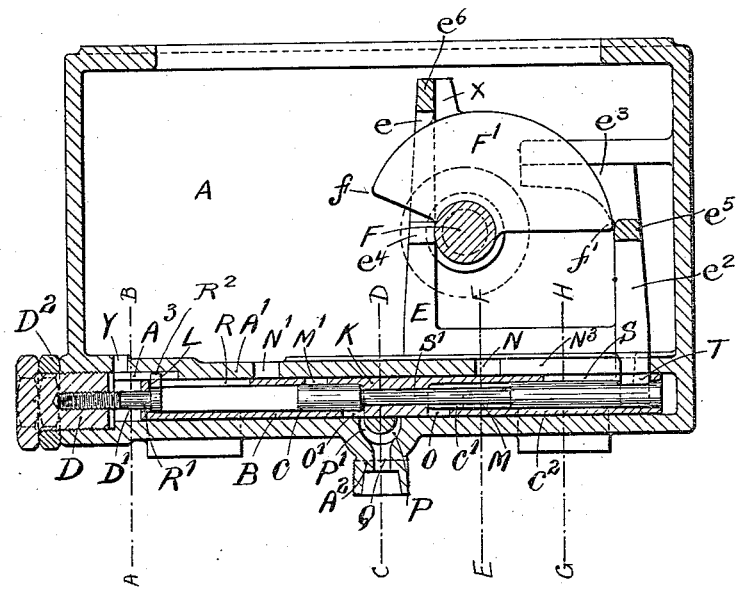
Figure 3:
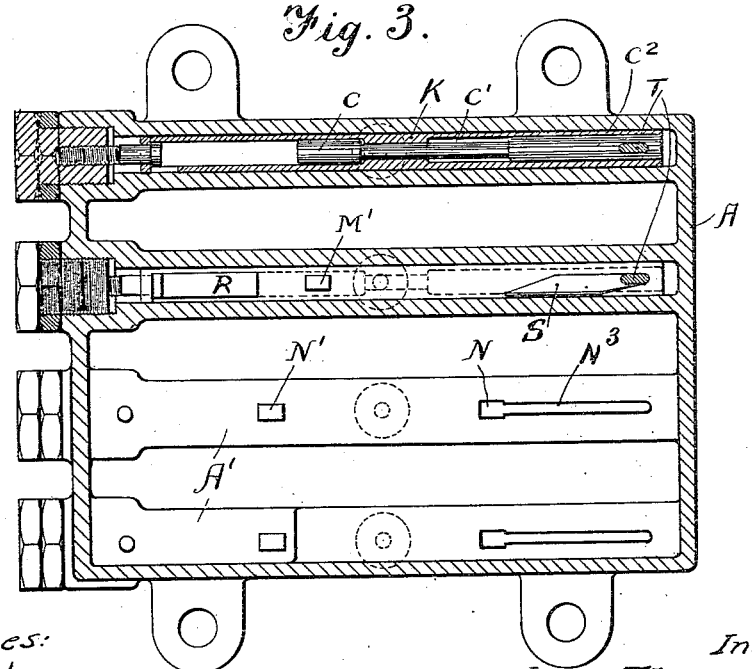

In the said drawings, Figure 1 is a longitudinal section; Fig. 2 is a cross sectional view of Fig. 1 illustrating the sections of the sleeve at different points corresponding to section lines A—B, C—D, E—F and G—H, of Fig. 1. Fig. 3 a plan view partly in section.

The floor of the oil reservoir A is formed with four barrels A' each having on its upper side two inlet ports N N', disposed respectively toward opposite ends of the barrel, and on its lower side outlet passages P P' which communicate with a discharge passage Q in a screw threaded stem A² midway of the barrel. To this stem is attached the pipe for conveying the lubricant to the bearing. Within each barrel A' is a tube or sleeve B divided by a central partition K into two chambers which are respectively provided with plungers C C² connected together by a rod C' passing through said partition. One end of the sleeve B is formed with an oblique slot S through which passes an arm or projection T provided on a carriage E and entering a slot in the plunger $c^2$. The arms T on the carriage C correspond in number to the sleeves B and an elongated slot $N^3$ is formed in each barrel A' to permit the passage of the arms T. The chambers in the sleeve B are respectively provided with inlet ports M M' and outlet ports O O'; the ports M M' being disposed at an angle to each other corresponding to the obliquity of the slot S, so that as the sleeve is oscillated by the arm T the ports M M' are alternately brought opposite to their respective ports N N' in the barrel A'. The sleeve B is passed into the barrel through one end thereof, which end is then closed by a screw threaded plug D furnished with lock nuts $D^2$. This plug is also furnished with a screw threaded stud D' the head of which engages with a shoulder L at the end of the sleeve B. The head of the stud is also formed with a projection $R^2$ which engages with a groove $A^3$ in the barrel A'; while the shank of the stud is formed with a screw which is twice the pitch of the screw upon the plug D. It will be observed that the sleeve B is shorter than the barrel A' and that there is a certain amount of "play" at the stud end of the sleeve. By means of the plug D and the stud D' the amount of this play may be increased or diminished so that during each stroke of the plungers C C² the sleeve is advanced to a greater or less extent in either direction longitudinally, and the extent of oscillation varied, consequently the travel of the plungers within the sleeve is likewise varied, as also the amount of lubricant discharged. The drawings illustrate the sleeve B set to the maximum discharge of the lubricant and to the minimum slip of the sleeve.

Transversely of the oil reservoir A and toward one end thereof is a shaft F supported at opposite ends in bearings G H and provided midway with a cam F'. The cam F' serves to actuate the carriage E which in the example illustrated comprises as to its front a central inserted U-shaped piece $e$, extending upward from a base $e'$ which slides on supports V V' formed upon the outermost pump barrels A' A', while at the sides of the carriage are provided uprights $e^2$ $e^2$ having their upper ends formed as slides $e^3$ $e^3$ which work in guides W, W'. The legs of the piece $e$ are formed with oppositely disposed projections $e^4$, $e^4$ while at the rear of the carriage is a transverse bar $e^5$; the cam F' during its rotation engaging with the said projections and bar as hereinafter described. The cam is of such a shape as to effect a uniform travel of the carriage E together with the plungers C C² and an even flow of the lubricant. To further insure a constant and even supply of the lubricant, the cam F' is provided with a projection X which engages with the cross piece $e^6$ at the top of the U-shaped piece during one portion of its revolution and with a lower cross piece $e^7$ at the rear of the carriage during another portion of its revolution. The cam shaft E may be provided with any suitable means for rotating same and in the example illustrated one end of the said shaft is furnished with a ratchet J contained in a case U provided with an arm J' and a lever U' which together with the ratchet is held upon the shaft F by a nut U². It will be understood that the cam F' is located as shown in Fig. 2 so that it is free to rotate between two adjacent pump barrels A'.

The operation of the lubricator is as follows:—The arm J' which is fixed to the case U and is connected with the ratchet is oscillated by any suitable means to rotate the shaft F. During the rotation of this shaft the carriage is reciprocated by means of the cam F', the projection X of which first engages with the cross piece $e^6$ and advances the carriage quickly forward a distance corresponding to a little more than the minimum "play" or slip of the sleeve B, that is to say, the distance between the end of the sleeve B and the plug D. The carriage having advanced to this extent the projection X disengages from the cross piece $e^6$ and the point $f$ of the cam F' then engages behind the projections $e^4$, $e^4$ on the legs of the U-shaped piece. The forward movement of the carriage E is now continued at a slower speed until the opposite end $f'$ of the cam disengages the said projections, which will be the end of the forward travel of the carriage E. At this stage the cam will have rotated a little more than half a revolution and the projection X will be adjacent to the lower cross-piece $e^7$ at the rear of the carriage E. The return of the carriage is now effected in a similar way by the projection X first engaging the cross-piece $e^7$, thereby quickly advancing the carriage, and then the movement of the carriage is continued more slowly by the cam engaging the transverse bar $e^5$ at the rear of the carriage.

Although I have described by way of example four lubricators in a single vessel it will be obvious that I may employ a greater or less number on a larger or smaller vessel. Indeed I may employ a single vessel divided into compartments for different classes of lubricants and provide each compartment with one or more lubricators actuated from a shaft common to all the lubricators. It will also be obvious that the means for reciprocating the plungers and the sleeves may also be modified.

What I claim as my invention and desire to secure by Letters Patent is:—

1. A lubricant feeding mechanism comprising in combination, a chamber containing the lubricant to be fed, a cylinder having inlets communicating with the said chamber and outlets for discharge of the lubricant, a sleeve in said cylinder having a partition dividing the same into separate piston chambers having inlets adapted for communication with the inlets of said cylinder, respectively, and outlets communicating with the outlets of said cylinder, respectively, pistons in said sleeve, and means for reciprocating and oscillating said sleeve and reciprocating said pistons, substantially as described.

2. A lubricant feeding mechanism comprising in combination, a chamber containing the lubricant to be fed, a cylinder having inlets communicating with the said chamber and outlets for discharge of the lubricant, a sleeve in said cylinder having a partition dividing the same into separate piston chambers provided with inlets adapted for communication with the inlets of said cylinder, respectively, and outlets adapted for communication with the outlets of said cylinder, respectively, pistons in said chambers, and means for oscillating said sleeve and reciprocating said pistons, substantially as described.

3. A lubricant feeding mechanism comprising in combination, a chamber containing the lubricant to be fed, a cylinder having inlets communicating with said chamber and outlets for discharge of the lubricant, a sleeve in said cylinder having a partition dividing the same into separate piston chambers provided with inlets adapted for communication with the inlets of said cylinder, respectively, and outlets communicating with the outlets of said cylinder, respectively, pistons in said sleeve, and means for reciprocating said piston and actuating said sleeve, substantially as described.

4. A lubricant feeding mechanism comprising in combination, a chamber containing the lubricant to be fed, a cylinder having inlets communicating with said chamber and outlets for discharge of the lubricant, a sleeve in said cylinder having piston chambers provided with inlets arranged and disposed to singly register with the inlets of said cylinder, respectively, and outlets arranged to singly register with the outlets of said cylinder, respectively, pistons in said piston chambers, and means for reciprocating said pistons and reciprocating and oscillating said sleeve to bring the inlets and outlets thereof into registry with the inlets and outlets of said cylinder, substantially as described.

5. A lubricant feeding mechanism comprising in combination, a receiver for the lubricant to be fed, a cylinder having inlets communicating with said receiver and outlets for discharge of the lubricant, a sleeve in said cylinder having inlets and outlets for communication with said inlets and outlets of said cylinder, pistons in said sleeve, means for reciprocating said pistons and oscillating and reciprocating said sleeve, and means for limiting the riciprocating and oscillating movement of said sleeve, substantially as described.

6. A lubricant feeding mechanism comprising in combination, a receiver for the lubricant to be fed, a cylinder having inlets communicating with the receiver and outlets for discharge of the lubricant, a sleeve in said cylinder having inlets and outlets for communication with the inlets and outlets of said cylinder, pistons in said sleeve, means for reciprocating said pistons and reciprocating and oscillating said sleeve and limiting the oscillating movement of said sleeve, substantially as described.

7. A lubricant feeding mechanism comprising in combination, a receiver for the lubricant to be fed, a cylinder having inlets communicating with the receiver and outlets for discharge of the lubricant, a sleeve in said cylinder having inlets and outlets for communication with the inlets and outlets of said cylinder, pistons in said sleeve, means for reciprocating said pistons and reciprocating said sleeve to bring the inlets of the sleeve and outlets thereof into communication with the inlets and outlets of said cylinder, and means for limiting the reciprocating movement of said sleeve, substantially as described.

8. A lubricant feeding mechanism comprising in combination, a receiver for the lubricant to be fed, a cylinder having inlets communicating with the receiver and outlets for discharge of the lubricant, a sleeve in said cylinder having inlets and outlets for communication with the inlets and outlets of said cylinder, pistons in said sleeve, means for reciprocating said pistons and oscillating and reciprocating said sleeve, and means for limiting the oscillating and reciprocating movement of said sleeve comprising a member non-rotatably connected with said cylinder and rotatably connected with said sleeve, substantially as described.

9. A lubricant feeding mechanism comprising in combination, a receiver for the lubricant to be fed, a cylinder having inlets communicating with said receiver and outlets for discharge of the lubricant, a sleeve in said cylinder having inlets communicating with the cylinder inlets and outlets communicating with the outlets of said cylinder, pistons in said sleeve, means for reciprocating said pistons and oscillating and reciprocating said sleeve, and an adjustable stud rotatably connected with said sleeve and non-rotatably connected with said cylinder, substantially as and for the purpose set forth.

10. A lubricant feeding mechanism comprising in combination, a receiver for the lubricant to be fed, a cylinder having inlets communicating with said receiver and outlets for discharge of the lubricant, a sleeve in said cylinder having inlets communicating with the cylinder inlets and outlets communicating with the outlets of said cylinder, pistons in said sleeve, and means for reciprocating said pistons, said sleeve having cam slots for engagement with said means whereby upon relative movement said sleeve is reciprocated and oscillated, substantially as described.

11. A lubricant feeding mechanism comprising in combination, a receiver for the lubricant to be fed, a cylinder having inlets communicating with the receiver and outlets for the discharge of the lubricant, a sleeve in said cylinder having inlets and outlets for communication with the inlets and outlets of said cylinder, pistons in said sleeve, and means for reciprocating said pistons and reciprocating and oscillating said sleeve, substantially as described.

12. A lubricant feeding mechanism comprising in combination, a receiver for the lubricant to be fed, a cylinder having inlets communicating with the said receiver and outlets for the discharge of the lubricant, a sleeve in said cylinder having inlets and outlets for communication with the inlets and outlets of said cylinder, pistons in said sleeve, means for reciprocating said pistons and oscillating said sleeve, and adjustable means for limiting the movement of said sleeve, substantially as described.

13. A lubricant feeding mechanism comprising in combination, a sleeve having intakes for communication with a source of supply of the lubricant and outlets for discharge of the lubricant, pistons in said sleeve, and means actuating said pistons to feed the oil and oscillating and reciprocating said sleeve to control the intake and discharge of the oil, substantially as described.

14. A lubricant feeding mechanism comprising in combination, a receiver for the lubricant to be fed, a cylinder having inlets communicating with the receiver and outlets for the discharge of the lubricant, a sleeve in said cylinder having inlets and outlets for communication with the inlets and outlets of said cylinder, pistons in said sleeve, and means for operating said pistons to feed the lubricant and oscillating and reciprocating said sleeve to control the intake and discharge of the lubricant, substantially as described.

15. A lubricant feed or controlling mechanism comprising in combination, a sleeve having an inlet for communication with a source of supply of the lubricant and an outlet for discharge of the lubricant, a piston in said sleeve, and a single operating member directly engaging the piston and sleeve to reciprocate the former and oscillate the latter, substantially as described.

16. A lubricant feeding mechanism comprising in combination, a sleeve having an intake communicating with a source of supply of the lubricant and an outlet for the discharge of the lubricant, a piston in said sleeve, and constantly driven means operating initially at a relatively rapid rate and subsequently at a relatively reduced rate to actuate said piston for feeding the oil and to oscillate and reciprocate said sleeve to control the intake and discharge of the oil, substantially as described.

17. A lubricant feed or controlling mechanism comprising in combination, a sleeve having an inlet for communication with a source of supply of the lubricant and an outlet for discharge of the lubricant, a piston in said sleeve, and a single reciprocating member directly engaging the piston and sleeve to reciprocate the former and oscillate the latter, substantially as described.

18. A lubricant feed or controlling mechanism comprising in combination, coacting lubricant controlling and feeding devices, and means for actuating the feeding device for feeding the lubricant and oscillating and reciprocating the controlling device for controlling the feed of the lubricant, substantially as described.

In witness whereof I have hereunto set my hand in the presence of two witnesses.

JOHN THOMAS.

Witnesses:
C. J. ASHDOWN,
J. O. FARRER.

Copies of this patent may be obtained for five cents each, by addressing the "Commissioner of Patents, Washington, D. C."